(12) United States Patent
Leigh et al.

(10) Patent No.: US 10,191,221 B1
(45) Date of Patent: Jan. 29, 2019

(54) OPTICAL ASSEMBLY WITH COVER TO BASE OPTO-MECHANICAL COUPLING

(71) Applicant: Hewlett Packard Enterprise Development LP, Houston, TX (US)

(72) Inventors: Kevin B. Leigh, Houston, TX (US); John Norton, Houston, TX (US); Paul Kessler Rosenberg, Sunnyvale, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/963,327

(22) Filed: Apr. 26, 2018

(51) Int. Cl.
G02B 6/36 (2006.01)
G02B 6/42 (2006.01)

(52) U.S. Cl.
CPC ......... G02B 6/3652 (2013.01); G02B 6/4257 (2013.01); *G02B 6/4285* (2013.01)

(58) Field of Classification Search
CPC .......... G02B 6/36; G02B 6/3652; G02B 6/42; G02B 6/4257; G02B 6/4285
See application file for complete search history.

(56) References Cited

U.S. PATENT DOCUMENTS

| | | | |
|---|---|---|---|
| 6,220,878 B1 * | 4/2001 | Poplawski | C07D 491/22 439/92 |
| 6,267,606 B1 * | 7/2001 | Poplawski | C07D 491/22 361/752 |
| 6,551,117 B2 | 4/2003 | Poplawski et al. | |
| 7,116,912 B2 * | 10/2006 | Pang | G02B 6/4201 398/139 |
| 7,371,014 B2 | 5/2008 | Willis et al. | |
| 9,354,403 B2 | 5/2016 | Seetharam et al. | |
| 2002/0009905 A1 * | 1/2002 | Poplawski | C07D 491/22 439/76.1 |
| 2003/0020986 A1 * | 1/2003 | Pang | G02B 6/4201 398/139 |
| 2006/0182442 A1 * | 8/2006 | Nagasaka | G02B 6/4214 398/41 |
| 2008/0044141 A1 * | 2/2008 | Willis | G02B 6/3887 385/88 |
| 2015/0301293 A1 * | 10/2015 | Seetharam | G02B 6/4277 385/60 |
| 2018/0225487 A1 * | 8/2018 | Leigh | G02B 6/4201 |

FOREIGN PATENT DOCUMENTS

JP 2013190539 A 9/2013

OTHER PUBLICATIONS

Murata; "Fiber Optical Transceiver" 3 pages; printed on Apr. 26, 2018 from: http://www.murata.com/about/newsroom/techmag/metamorphosis20/productsmarket/module.

* cited by examiner

*Primary Examiner* — Andrew Jordan
(74) *Attorney, Agent, or Firm* — Hewlett Packard Enterprise Patent Department

(57) ABSTRACT

An optical assembly is provided that includes a base sub-assembly a mounting point for an optical socket connector. The optical assembly further comprises a cover sub-assembly to be coupled to the base sub-assembly and a carrier to receive an optical fiber ferrule and permit opto-mechanical coupling between the optical fiber ferrule and the optical socket connector when the base-sub assembly is coupled to the cover sub-assembly.

20 Claims, 12 Drawing Sheets

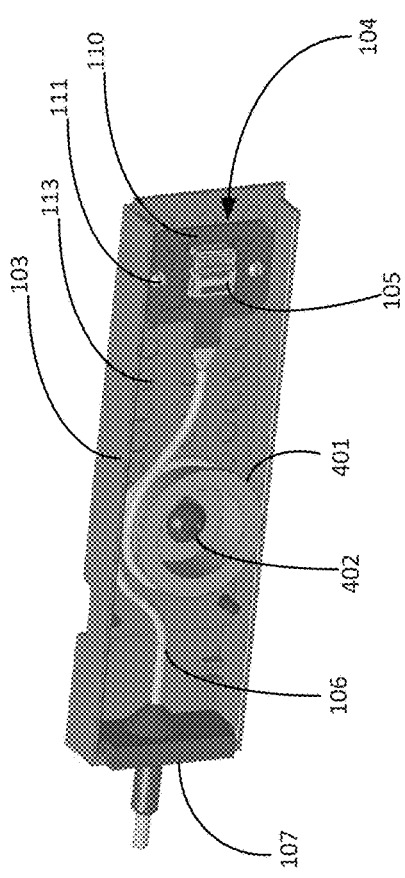
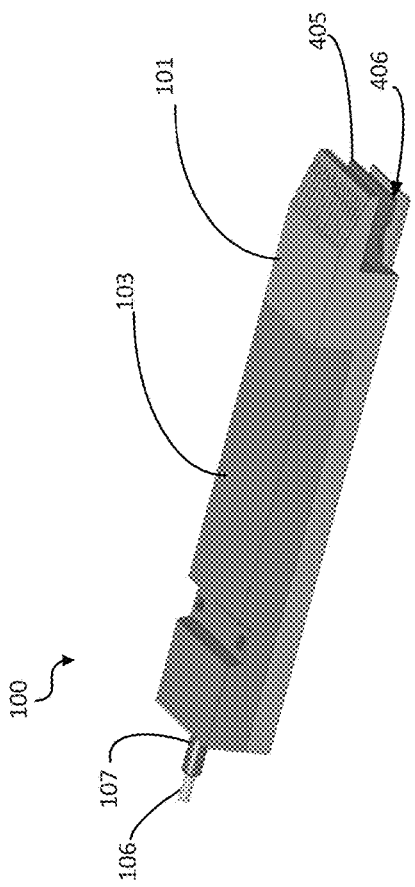
FIG. 4A
FIG. 4B

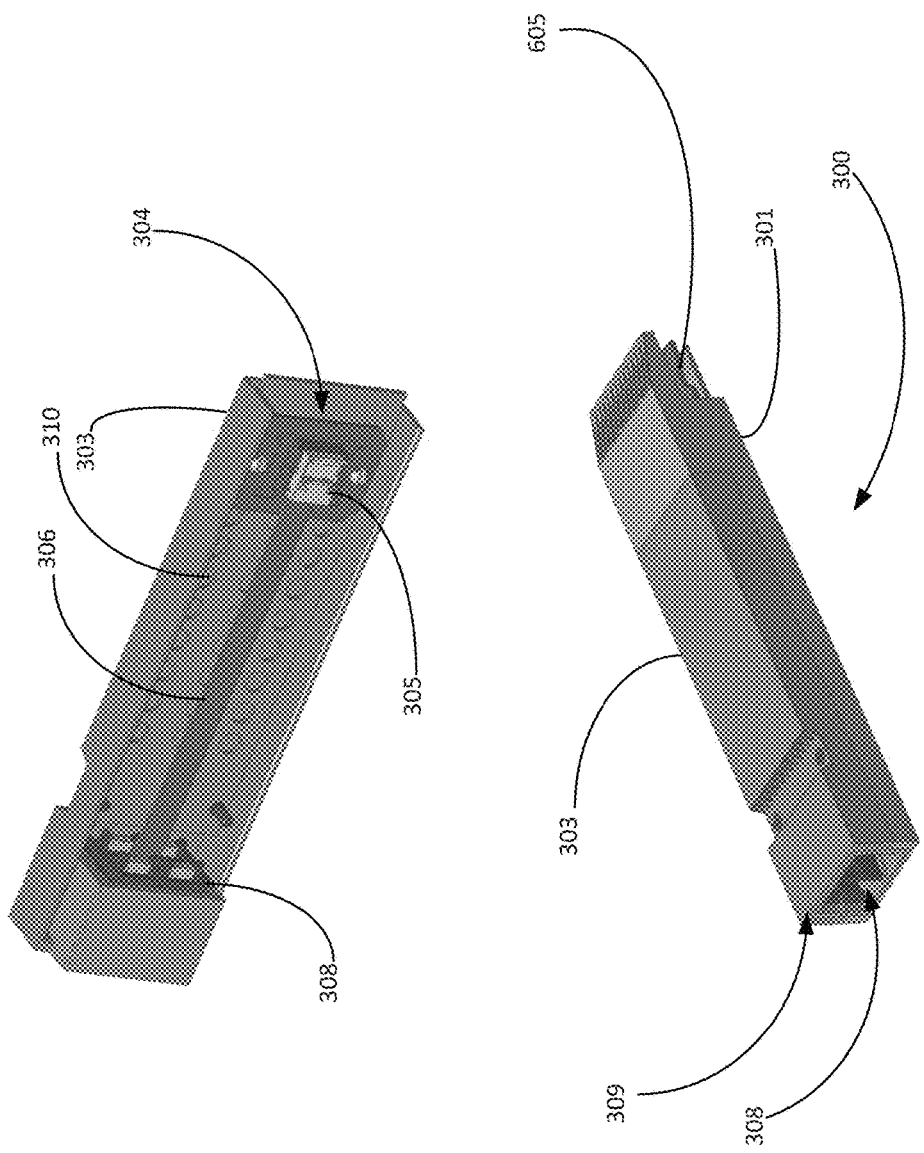

OPTICAL ASSEMBLY WITH COVER TO BASE OPTO-MECHANICAL COUPLING

BACKGROUND

Optical assemblies includes a number of products designed to assist in constructing an optical system. Optical assemblies contain an assortment of components as well as kits designed to meet many common optical or laser needs such as mounting, alignment, beam manipulation, or focusing. Existing pluggable transceivers in optical assemblies can be complex and expensive as they may require several stages of optical connections to create an interconnect mesh topology.

BRIEF DESCRIPTION OF THE DRAWINGS

FIGS. 4A and 4B illustrate an example of an optical assembly related to FIG. 1

FIGS. 6A and 6B illustrate an example of an optical assembly related to FIG. 3.

DETAILED DESCRIPTION

The present disclosure proposes an optical assembly that can be used as an active optical cable (AOC) or a pluggable transceiver module with various optical connectors such as single-bay or multi-bay optical connectors to enable flexible configurations within the same optical assembly for multi-mode fibers (MMF) and single-mode fibers (SMF). The proposed solution permits various optical module configurations using the same building block parts. Hence, a lower cost manufacturing solution is achieved that enables optical connections for different optical transceivers.

Figure 1:
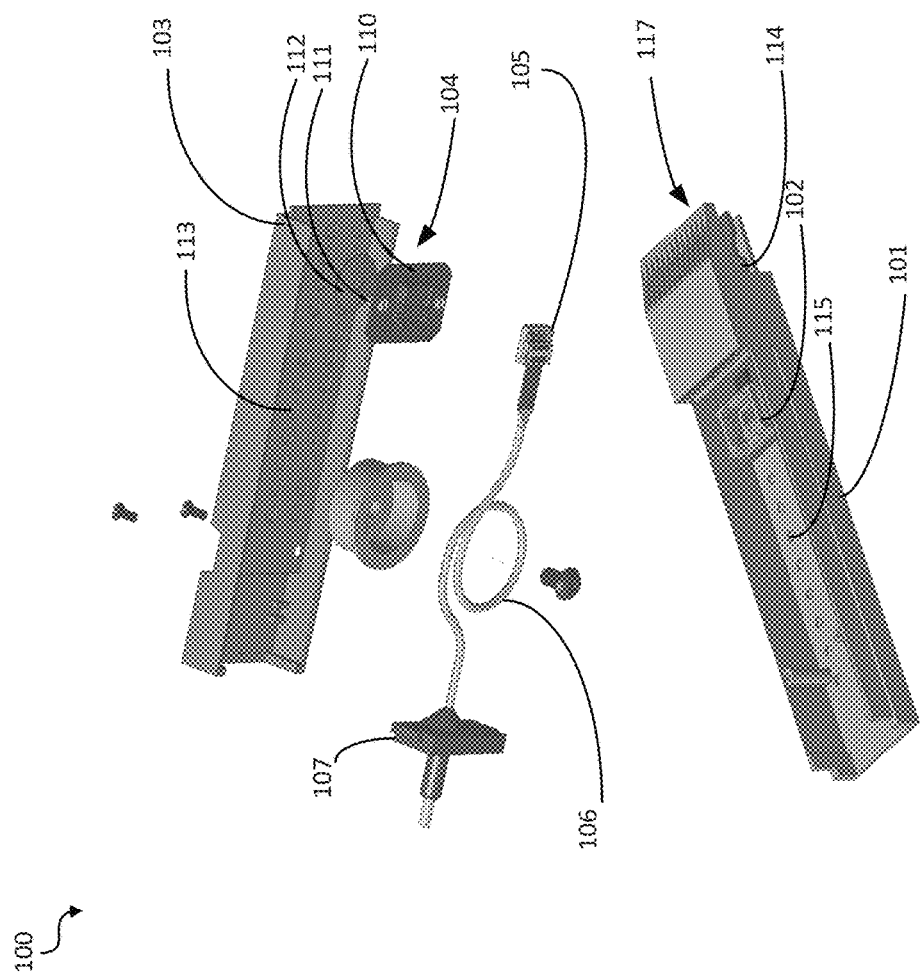
FIG. 1 illustrates an example of an optical assembly.

FIG. 1 shows an example of an optical assembly 100 according to the present disclosure. The optical assembly 100 comprises a base sub-assembly 101. The base sub-assembly 101 comprises an optical socket connector 102. The base sub-assembly 101 can be designed according to an industry standard form factor, such as a Quad Small Form-factor Pluggable (QSFP), QSFP double density (QSFP-DD), Octal Small Format Pluggable (OSFP), CDFP, etc. Furthermore, the optical assembly 100 comprises a cover sub-assembly 103 to be coupled to the base sub-assembly 101. The cover sub-assembly 103 comprises ferrule retention features 104 to retain an optical fiber ferrule 105 in the optical socket connector 102 when the sub-assembly 103 is coupled to the base sub-assembly 101. The combination of the cover sub-assembly 103 and the base sub-assembly 101 creates an optical assembly 100. The optical fiber ferrule 105 can be attached to an optical cable 106.

The ferrule retention features 104 permits opto-mechanical coupling between the optical fiber ferrule 105 and the optical socket connector 102. In some examples, the optical fibers of the optical cable 106 can comprise multi-mode fibers (MMF) or single-mode fibers (SMF). As described further below, the ferrule retention features 104 may include a ferrule carrier 110 that includes an upper socket to retain the ferrule 105 within the socket connector 102. The ferrule retention features 104 may further include a spring, such as a Belleville washer (or disc spring) 112 to bias the carrier 110 towards the bottom of the base sub-assembly 101 to ensure that the ferrule 105 is fully seated when the assembly 100 is assembled. The ferrule retention features 104 further include a plurality of guide pins 111. The guide pins are retained in indents 113 on the underside of the cover sub-assembly 103 and are attached to the ferrule carrier 110. The ferrule carrier 110 may be placed in any of the different locations enabled by the different indent locations 113, allowing the optical assembly 100 to accommodate different ferrules 105 and socket connectors 102.

In this example, the optical socket connector 102 is disposed on a paddle card 114. As discussed further below, the paddle card 114 provides the interconnection between the socket connector 102 and the system electrical interface 117 of the optical assembly 100. The base sub-assembly 101 may comprise a plurality of mounting locations 115 (such as indents for guide pins/screws) to allow various different paddle card types to be installed in the base sub-assembly 101. As the various different paddle card types may have different locations of the socket connector 102, the different mounting locations 113 on the pluggable cover sub-assembly 103 allow the ferrule retention features 104 to be installed at a location corresponding to the socket connector 102 to enable interconnection between the ferrule 105 and the socket connector 102.

The cover sub-assembly can comprise varying interfaces that can be modularly installable to the base sub-assembly 101. Examples of cover sub-assemblies according to the present disclosure can be a cable cover sub-assembly, e.g. to build an active optical component (AOC) cable optical assembly with different cable lengths as shown in FIG. 1, a cover sub-assembly a single-bay optical connector as e.g. a Multi-Fiber Push On (MPO) cover as shown in FIG. 2 or a multi-bay optical connector as e.g. a ROx cover as shown in FIG. 3.

In some examples, the optical assembly 100 comprises a support frame or filler 107. The optical cable 106 can be attached or held to the cover sub-assembly 103 by this support frame 107. A common base sub-assembly design 101 may be used with various different cover sub-assemblies 103 providing a lower cost manufacturing solution.

Figure 2:
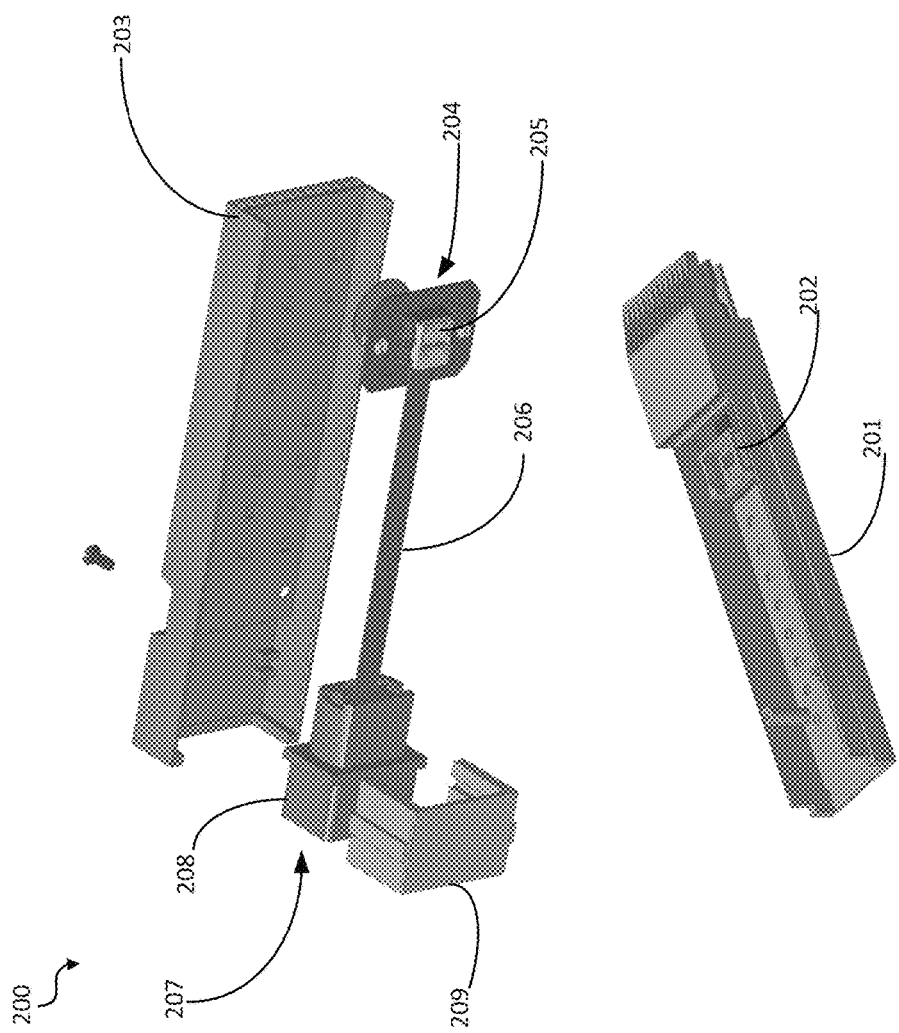
FIG. 2 illustrates an example of an optical.

FIG. 2 shows an example of an optical assembly 200. The optical assembly 200 comprises a base sub-assembly 201. The base sub-assembly 201 comprises an optical socket connector 202. Furthermore, the optical assembly 200 comprises a cover sub-assembly 203 to be coupled to the base sub-assembly 201. The cover sub-assembly 203 comprises ferrule retention features 204 to permit establishment of an optical fiber assembly, the optical fiber assembly comprising an optical fiber ferrule 205 attached to an optical pig-tail fiber 206 that is in turn attached to a single-bay optical connector 207. In some examples, the single-bay optical connector 207 comprises a single-bay socket 208 attached to the cover sub-assembly 203 by a support frame or filler 209. While illustrated with multiple fibers 206, some implementations may utilize only a single fiber. The ferrule retention features 204 permit opto-mechanical coupling between the optical fiber ferrule 205 and the optical socket connector 202. In some examples, the optical fibers comprised in the optical pig-tail fiber 206 can be multi-mode fibers (MMF) or single-mode fibers (SMF).

Figure 3:
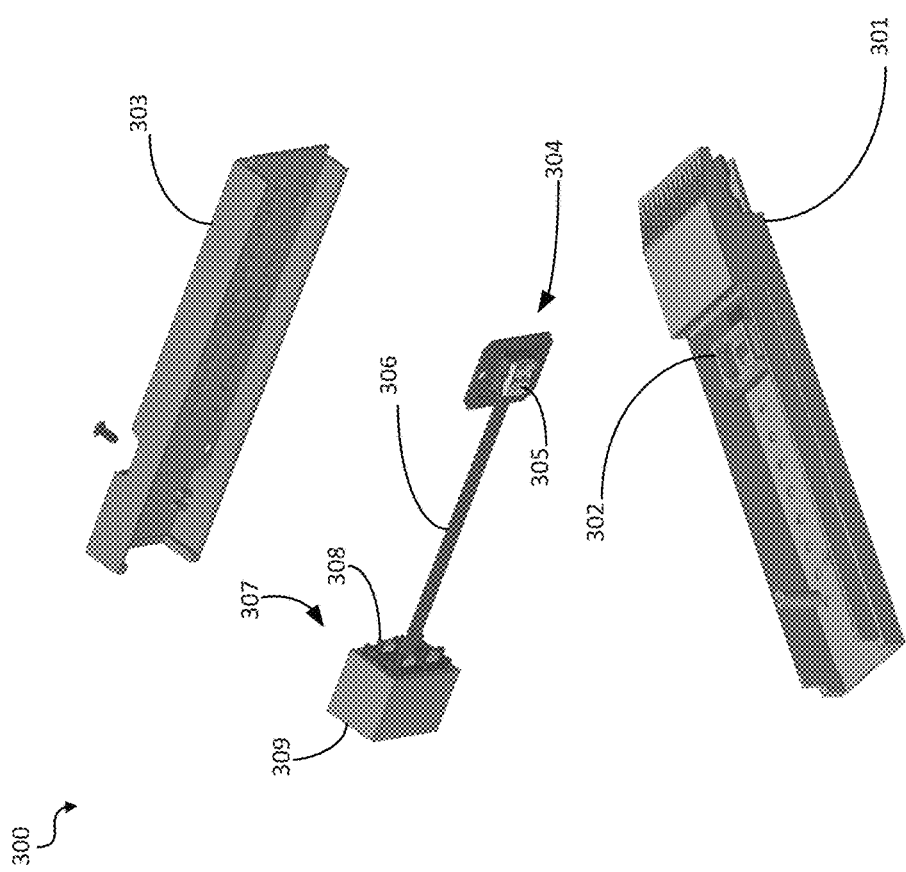
FIG. 3 illustrates an example of an optical assembly according to the present disclosure.

FIG. 3 shows an optical assembly 300 according to the present disclosure. The optical assembly 300 comprises a base sub-assembly 301. The base sub-assembly 301 comprises an optical socket connector 302. Furthermore, the optical assembly 300 comprises a cover sub-assembly 303 to be coupled to the base sub-assembly 301. The cover sub-assembly 303 comprises ferrule retention features 304 to permit establishment of an optical fiber assembly, the optical fiber assembly comprising an optical fiber ferrule 305 attached to an optical pig-tail fiber 306 that is in turn attached to a multi-bay optical connector 307. The ferrule retention features 304 permit opto-mechanical coupling between the optical fiber ferrule 305 and the optical socket connector 302. In some examples, the optical fibers comprised in the optical pig-tail fiber 306 can be multi-mode fibers (MMF) or single-mode fibers (SMF). The optical assembly 300 differs from the optical assembly 200 of FIG. 2 by comprising multiple ferrules and a multi-bay socket 308. In this example, fibers from the optical fiber ferrule 305 are correspondingly attached to each of the multiple ferrules installed in the multi-bay socket 308. The multi-bay socket 308 can be attached or secured to the cover sub-assembly 303 by a support frame or filler 309.

FIG. 4A shows the assembled elements of the cover sub-assembly 103 to be coupled to the base sub-assembly 101 of FIG. 1. In this figure, the ferrule retention features 104 are coupled to the cover sub-assembly 103 via the guide pins 111 being inserted through the carrier 110 into a pair of indents 113.

In this example, the cover sub-assembly 103 comprises a mandrel 401 to wrap the optical cable 106. The mandrel 401 can be mechanically attached to the pluggable cover sub-assembly 103 using a screw 402. Single-mode opto-electronic components may generate more modes than desired. The mandrel 401 may be used as a mode filter, i.e., to wrap the single-mode fiber from the optical transceiver to filter out unwanted modes to achieve single-mode signal. In some examples, the cover sub-assembly 103 comprises retention features to secure the cover sub-assembly to the base sub-assembly, e.g. screws, notches, grooves, etc.

FIG. 4B shows the optical assembly 100 assembled, e.g., the cover sub-assembly 103 coupled to the base sub-assembly 101. Furthermore, FIG. 4B shows the optical cable 106 and the support frame or filler 107. The optical cable 106 can be attached or held between the cover sub-assembly 103 and the base sub-assembly 101 by this support frame 107. Furthermore, FIG. 4B shows a paddle card 405 on which the optical socket 102 shown in FIG. 1 and the optical processing circuitry can be disposed. In some examples, the optical assembly 100 can conform to various module standards, such as a quad small form-factor pluggable (QSFP) module or can have a custom dimensionality. The distal end of the paddle card 406 that exposes through the end of the optical assembly 100 provides the appropriate electro-mechanical interface for the pluggable module standard to which the optical assembly 100 conforms. For example, the distal end of the paddle card 406 may comprise electrical traces to provide an electrical interface to provide electrical connectivity to the opto-electronic components within the assembly. For example, the electrical traces may carry received or transmitted electronic data signals.

Figures 5A, 5B:
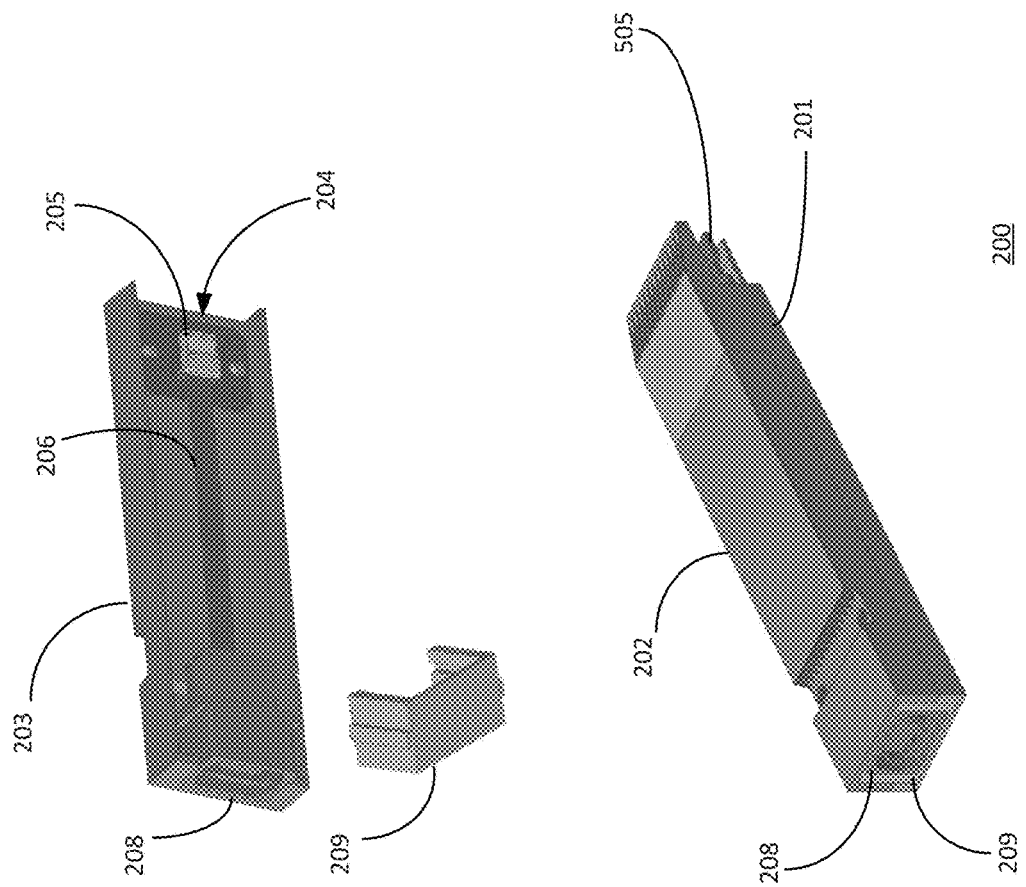
FIGS. 5A and 5B illustrate an example of an optical assembly related to FIG. 2

FIG. 5A shows the elements of the cover sub-assembly 203 to be coupled to the base sub-assembly 201 previously shown in FIG. 2. The cover sub-assembly 203 comprises ferrule retention features 204 to permit establishment of an optical fiber assembly. The optical fiber assembly comprising an optical fiber ferrule 205 attached to an optical pig-tail fiber 206 that is in turn attached to a single-bay optical connector comprising a single ferrule and a single-bay socket 208. The single-bay socket 208 can be attached or hold to the cover sub-assembly 203 by a support frame or filler 209. The filler frame 209 may be sandwiched between the two sub-assemblies 201, 202 to allow the particular socket 208 to be used with the sub-assemblies.

FIG. 5B shows the optical assembly 200 assembled, e.g., the cover sub-assembly 203 coupled to the base sub-assembly 201. As it can be seen the single-bay socket 208 can be held by the support frame 209, and between the cover sub-assembly 203 and the base sub-assembly 201. Furthermore, FIG. 5B shows a paddle card 505 on which the optical socket 102 shown in FIG. 1 and optical processing circuitry can be disposed.

FIG. 6A shows the elements of the cover sub-assembly 303 to be coupled to the base sub-assembly 301 previously shown in FIG. 3. The optical assembly 300 comprises a cover sub-assembly 303 to be coupled to the base sub-assembly 301. The cover sub-assembly 303 comprises ferrule retention features 304 to permit establishment of an optical fiber assembly, the optical fiber assembly 300 comprising an optical fiber ferrule 305 attached to an optical pig-tail fiber 306 that is in turn attached to a multi-bay optical connector. The multi-bay optical connector comprises a multi-bay socket 308. In the illustrated example, the he multi-bay socket 308 is sized to fit into the opening 309 at the distal end of the assembly 300 without the use of a support frame. Accordingly, the use of the support frames in some deployments (such as that of FIG. 2) permits the dimensionality of the sub-assemblies 303, 301 may be the same as that of sub-assemblies 203, 201 while allowing the creation of different assemblies 200, 300 as needed.

FIG. 6B shows the optical assembly 300 assembled, e.g. the cover sub-assembly 303 coupled to the base sub-assembly 301. As it can be seen the multi-bay socket 308 can be held between the cover sub-assembly 303 and the base sub-assembly 301. Furthermore, FIG. 6B shows a paddle card 605 on which the optical socket 302 shown in FIG. 3 and optical processing circuitry can be established. In some examples, the base sub-assembly 301 can be a quad small form-factor pluggable (QSFP) assembly or a custom pluggable sub-assembly.

Figure 7A:
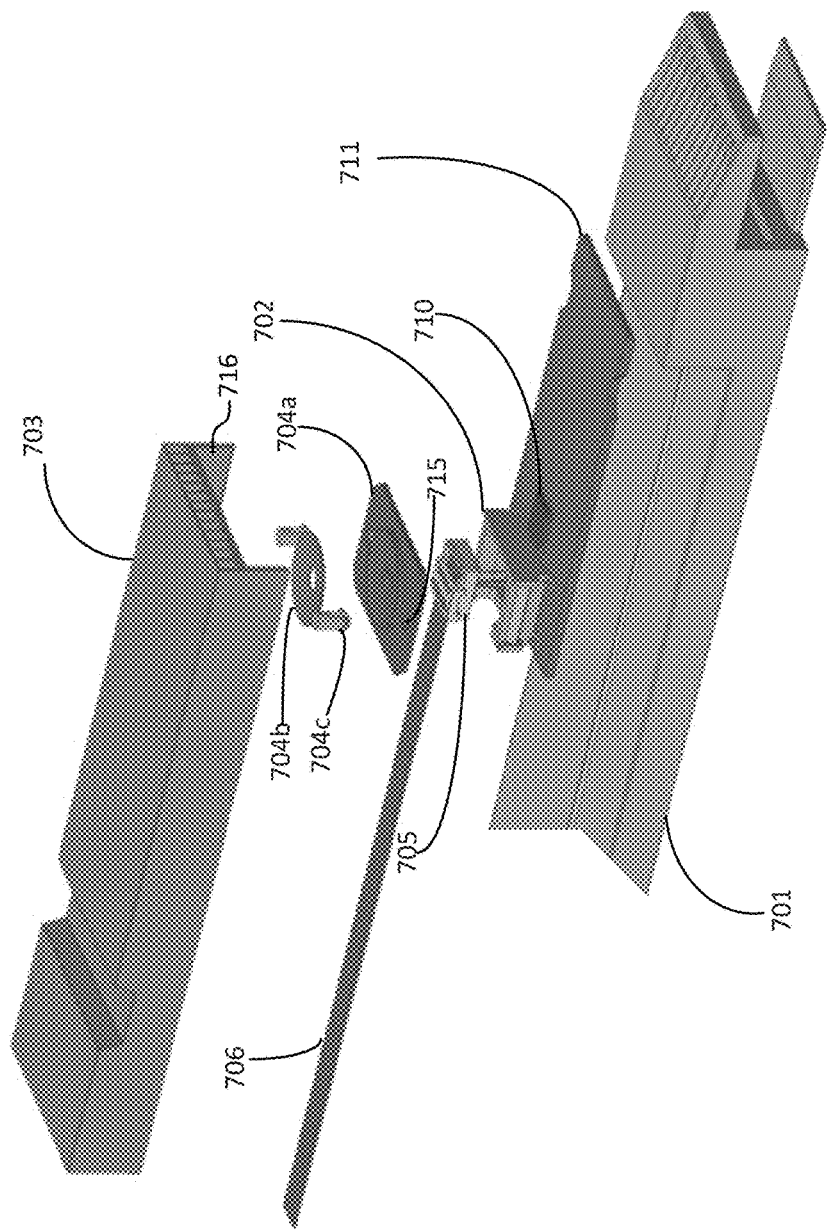
FIGS. 7A-7D illustrate various aspects of an optical assembly.

FIG. 7A shows an exploded view of elements of an optical assembly 700 according to any of the examples shown in FIGS. 1-6. FIG. 7 shows a cover sub-assembly 703 to be coupled to a base sub-assembly 701. Furthermore, the optical assembly 700 comprises ferrule retention features 704a-c that comprise a ferrule carrier 704a to attach a ferrule 705 of an optical cable 706 as part of the optical fiber assembly. The ferrule carrier 704a and the ferrule 705 can be opto-mechanically aligned with an optical socket connector 702. Furthermore, the ferrule retention features comprise guide pins 704c to secure the ferrule carrier 704a on the cover sub-assembly 704 and a disc spring 704b to allow the ferrule to float in various directions during the coupling process.

Furthermore, FIG. 7A shows a base sub-assembly 701 into which a paddle card 711 can be installed. The paddle card 711 includes an optical socket connector 702 and an integrated circuit (IC) 710. The optical socket connector 702 may be configured as described herein elsewhere. IC 710 may comprise electronic transceiver circuitry to support the opto-electronic components elsewhere on the paddle card 711. For example, IC 710 may include circuits such as laser drivers, trans-impedance amplifiers (TIAs), host interface receivers, host interface transmit drivers, electrical signal conditionings, and host management interface logic. Although illustrated on the upper surface of the paddle card 711 proximate to the socket connector 702, the IC 710 may be disposed on the bottom surface of the paddle card 711, or may be split into multiple chips disposed on various locations of the paddle card 711. Additionally, the paddle card may include various unillustrated components, such as voltage regulators, capacitors, inductors, resistors, additional signal conditioner circuits, etc. Furthermore, the paddle card may be a one-piece PCB, two-piece PCBs, or a PCB and a flexible circuit interconnected with electrical connectors.

Figure 7B:
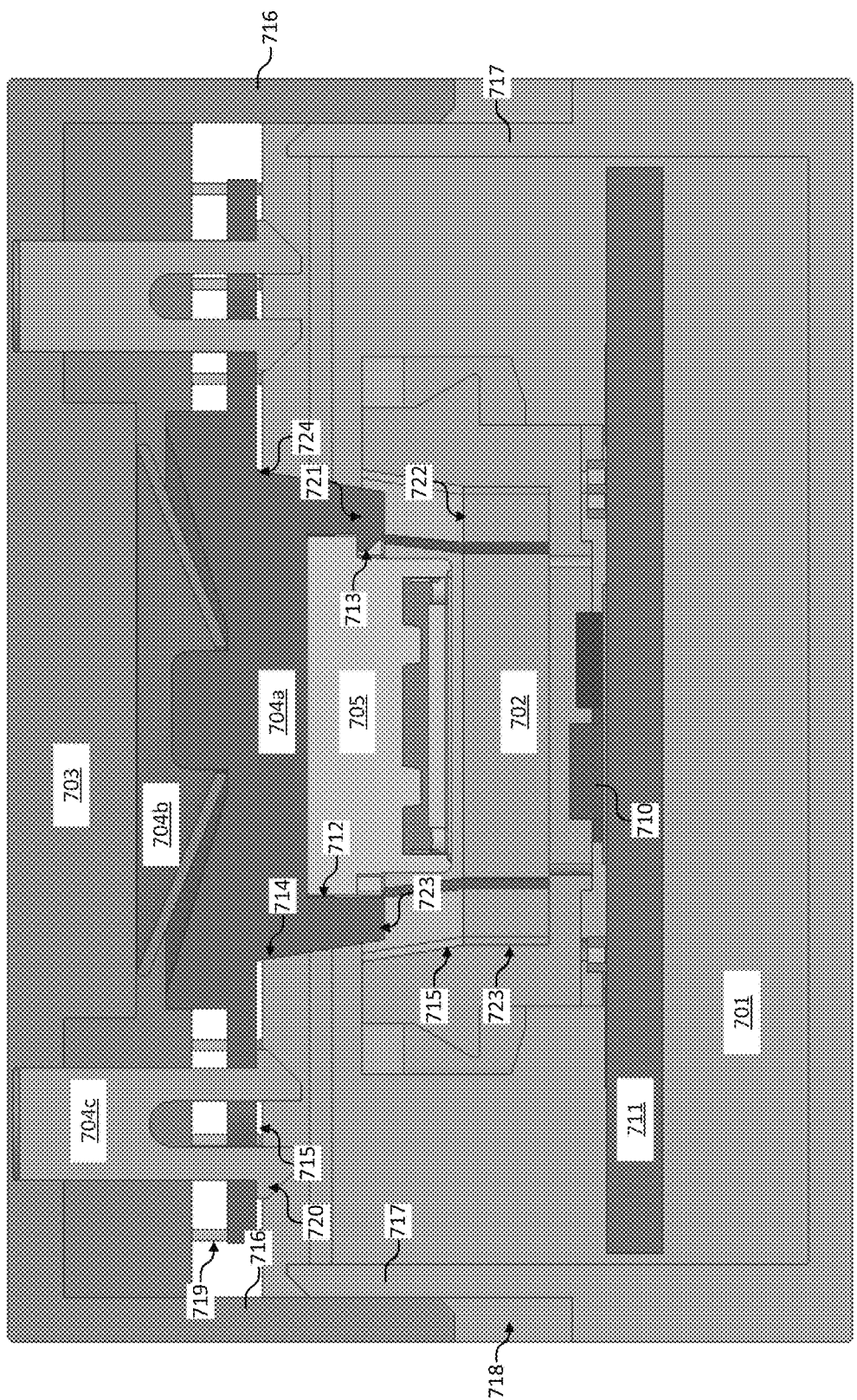
Figure 7C:
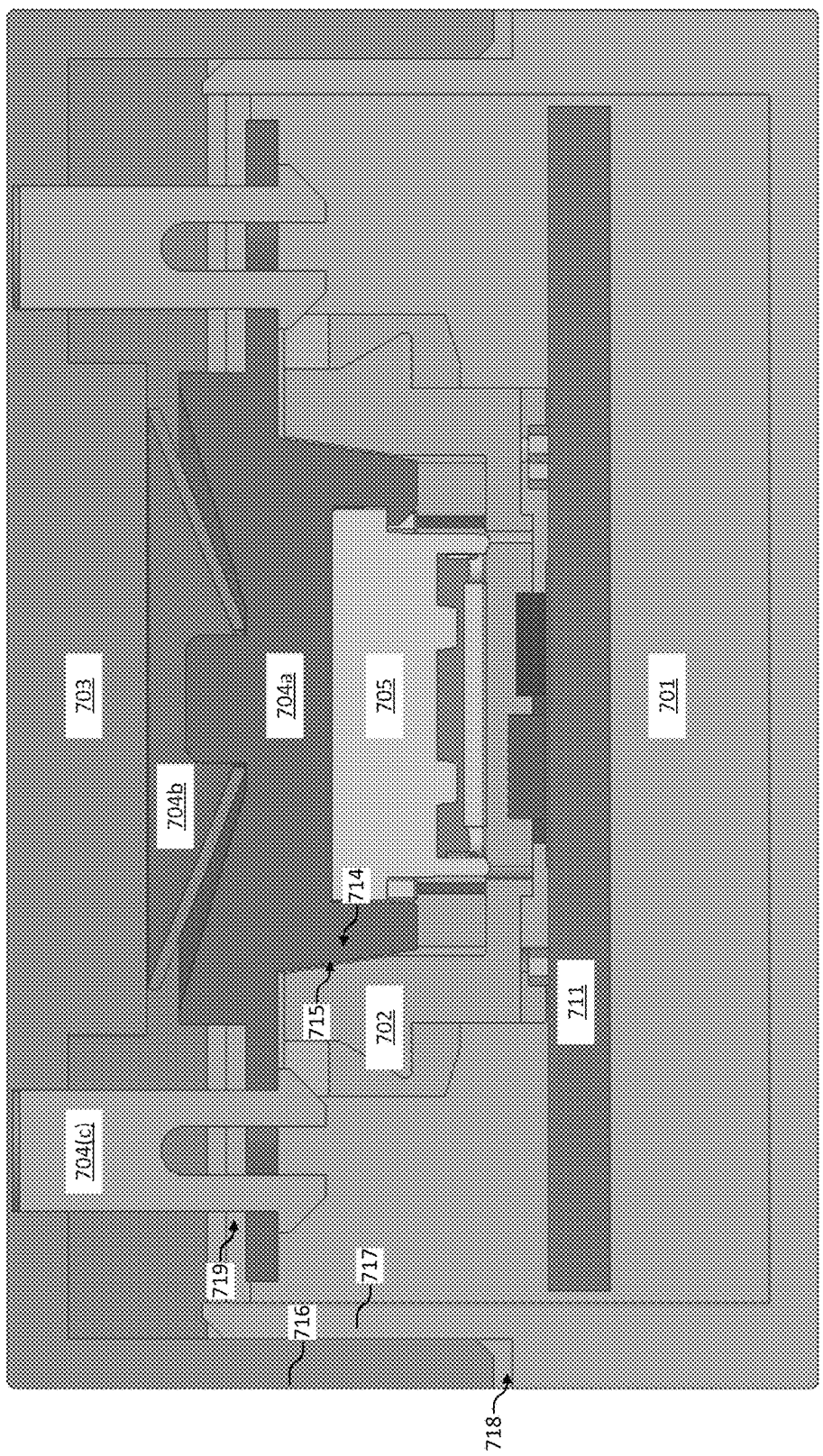
Figure 7D:
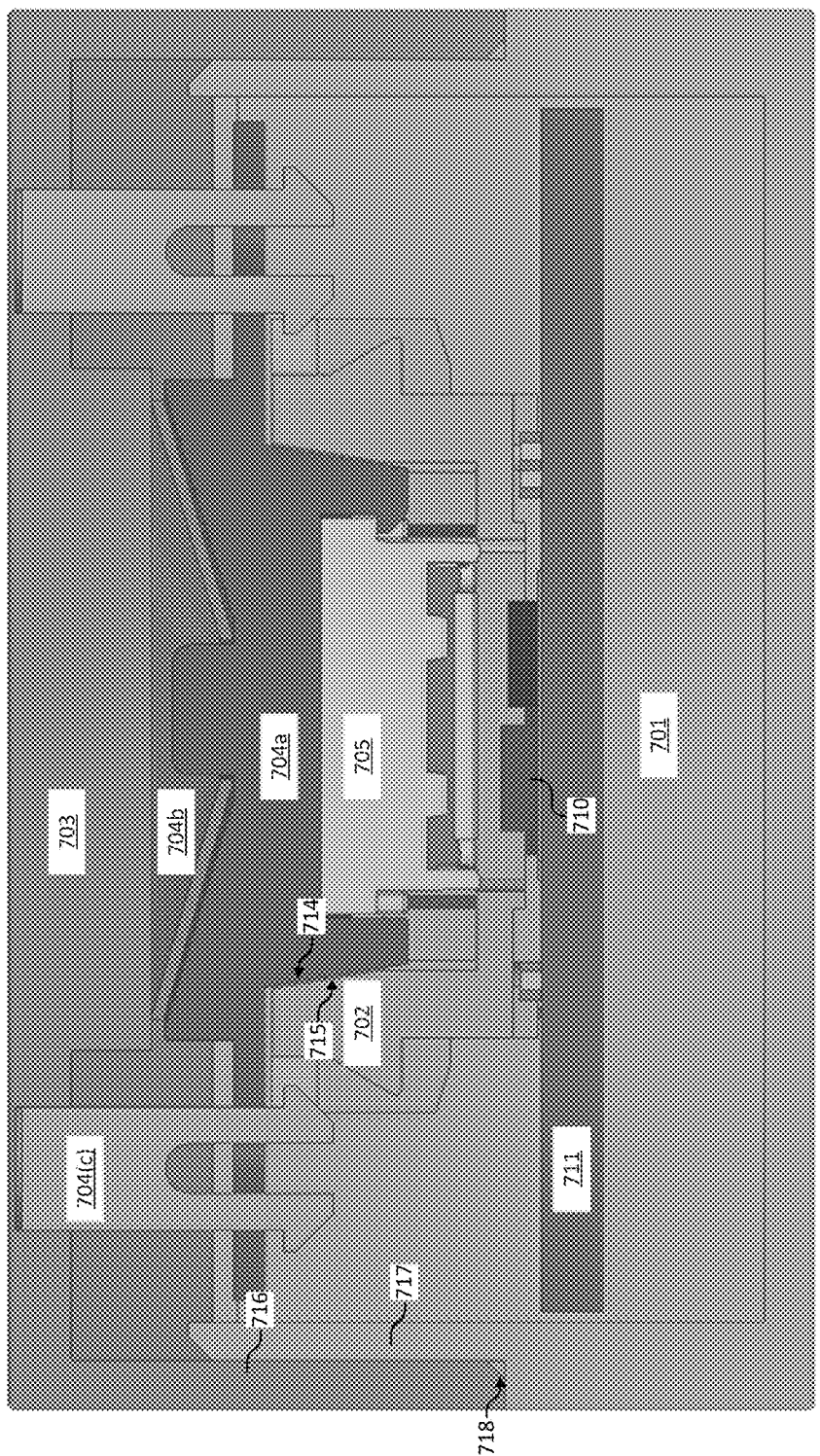

FIGS. 7B, 7C, and 7D illustrate operation of the ferrule retention features 704a-c when the cover sub-assembly 703 is attached to the base sub-assembly 701.

FIG. 7B illustrates the initial phase of coupling the cover sub-assembly 703 to the base sub-assembly 701. At this state, the guide pins 704c are inserted through the corresponding holes 715 of the carrier 704a. Catches 720 at the distal ends of the guide pins 704 retain the carrier 704a. The ferrule 705 is retained in a distal socket of the carrier 704a defined by inner sidewalls 712. A catch 713 retains the ferrule 704 in the carrier 704a. The disc spring 704b is disposed between the carrier 704a and the inner upper surface of the cover sub-assembly 703. At this state, the spring 704b is uncompressed and the carrier 704a is separated from its final position by a float gap 719 corresponding to the height difference between the compressed and uncompressed spring 704a.

The cover sub-assembly comprises a pair of sidewalls 716 projecting away from the upper surface of the sub-assembly 703. The sidewalls 717 of the base sub-assembly comprise indentations 718 that correspond to the sidewalls 716. The interplay between sidewalls 716 and 717 provide rough mechanical alignment to align the distal portion of the carrier 704a with the upper portion of the socket of the connector 702.

The socket of the connector 702 comprises sidewalls having a slanted portion 715 and a vertical portion 723. Accordingly, the opening 721 of the socket is wider than the lower portion 722 of the socket. For example, the slanted sidewalls 715 may define a frustum-shaped or trapezoidal parallelepiped-shaped hole. Similarly, carrier 704a comprises a projection having the outer sidewalls 714 that are slanted such that the end 723 of the projection is narrower than the base. For example, the projection of the carrier 704a may have a shape fitting into the socket of the connector 702. The rough mechanical alignment provided by the sidewalls 716, 717 aligns the end 723 of the projection with the opening 721. The play provided by the float gap 719 accommodates the fine mechanical alignment described below with respect to FIG. 7C.

FIG. 7C illustrates the cover sub-assembly 703 partially coupled to the base sub-assembly 703. As the cover sub-assembly 703 is pressed together with the base sub-assembly 701, the sidewalls 714 contact the sidewalls 715 and the ferrule 705 is moved into precise alignment with the connector 702. At this point, the carrier 704a has bottomed out into the socket of the connector 702. However, the sidewall 716 has not yet bottomed out in the indentation 718. The float gap 719 has been reduced to a distance corresponding to the end of the sidewall 716 and the bottom of the indentation 718. At the illustrated point, the spring 714b may be uncompressed or partially compressed.

FIG. 7D illustrates the cover sub-assembly 703 fully coupled to the base sub-assembly 701. At the illustrated point, the sidewall 716 has bottomed out in the indentation 718 and the float gap 719 is eliminated. The spring 704b is compressed, and its restoring force urges the carrier 704a and ferrule 705 downward, ensuring continuous connection between the ferrule 705 and connector. Additionally, the retention feature (see, FIG. 8 ref. 818) is engaged, securing the cover sub-assembly 703 to the base sub-assembly 701.

Figure 8:
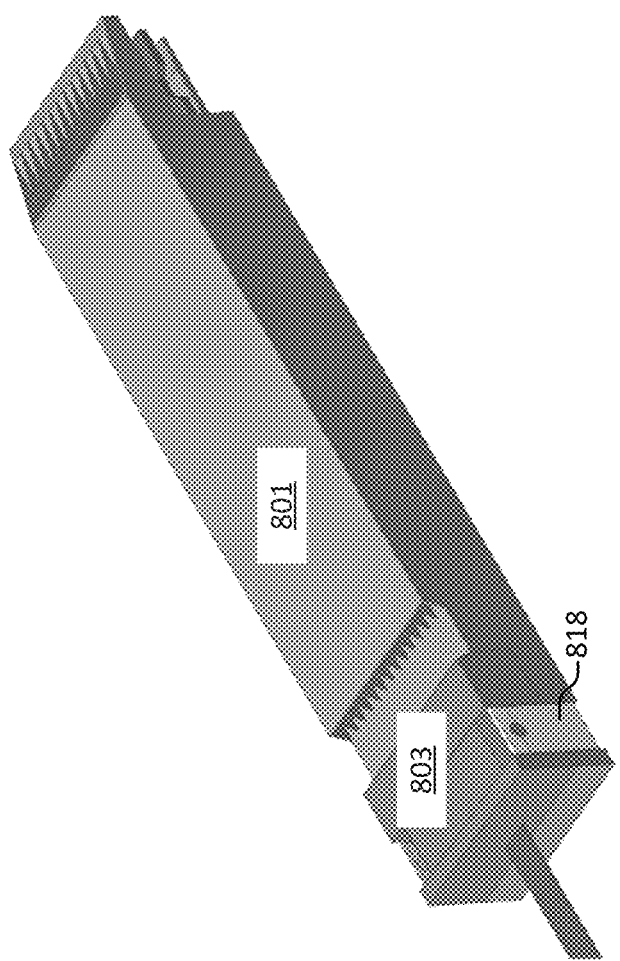
FIG. 8 illustrates an example optical assembly.

FIG. 8 illustrates an example of final assembled optical assembly including a retention feature 818. In this example, the retention mechanism 818 is a latch coupling the cover sub-assembly 803 to the base sub-assembly. As described above, the latch engages with the base sub-assembly 801 to secure the cover sub-assembly 803 to the base sub-assembly 801 once the internal spring is fully compressed and the internal ferrule is fully engaged with the internal connector.

Figure 9:
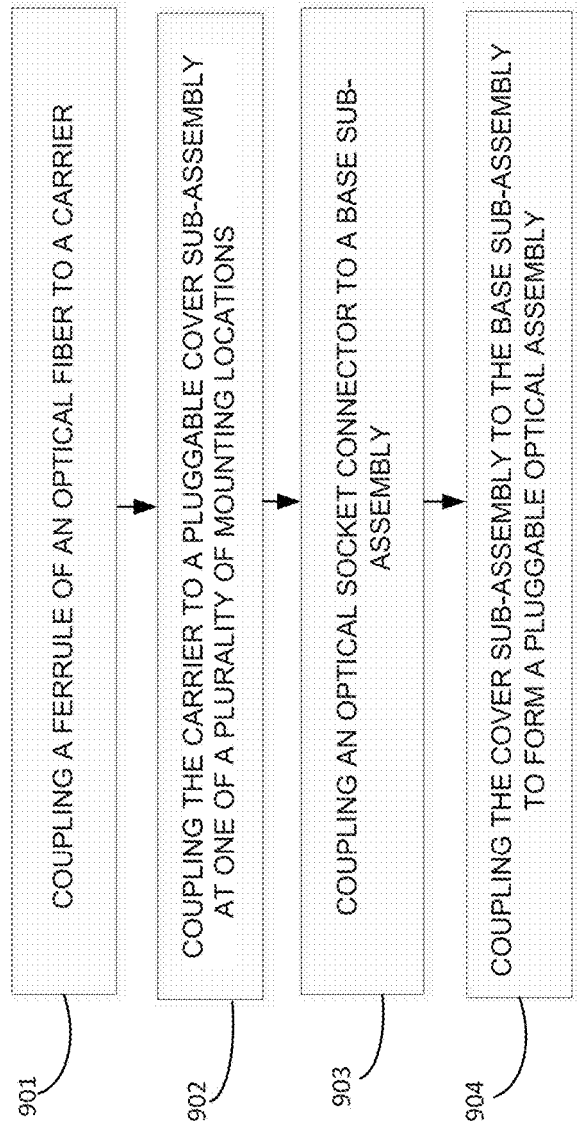
FIG. 9 illustrates an example of a flowchart for assembling an optical assembly according to the present disclosure.

FIG. 9 illustrates an example method of assembling an optical assembly. For example, the optical assembly may be any of the optical assemblies illustrated in FIGS. 1-8.

Block 901 comprises coupling a ferrule of an optical fiber to a carrier. For example, as described above, the ferrule and optical fiber may be any one of various different types of ferrules and cables selected according to the specific deployment. The carrier may be a carrier specifically configured to retain the ferrule. For example, the carrier may have a custom socket dimensioned to accept and retain the ferrule.

Block 902 comprises coupling the carrier to a cover sub-assembly at one of a plurality of mounting locations. As described above, the cover sub-assembly may comprise a plurality of mounting locations to enable the optical assembly to accommodate different types of optical connector sockets and paddle cards. For example, the carrier may be coupled to the cover sub-assembly using guide pins inserted into indents of an array of indents disposed on an inner surface of the cover sub-assembly.

Block 902 may further comprise disposing a disc spring between the carrier and the inner surface of the cover sub-assembly. As discussed above, prior to coupling the cover sub-assembly to the base sub-assembly, the disc spring may be in an uncompressed state and the carrier may be separated from the cover sub-assembly by a float gap. The float gap and spring may provide sufficient play to the carrier to allow the carrier and ferrule to be roughly aligned with the socket connector. In this implementation, after coupling the cover sub-assembly to the base sub-assembly, the disc spring is in a compressed stand and the float gap is removed.

Block 903 comprises coupling an optical socket connector to a base sub-assembly. For example, block 903 may comprise coupling a paddle card comprising the optical socket connector to the base sub-assembly.

Block 904 comprises coupling the cover sub-assembly to the base sub-assembly to form a pluggable optical assembly. In some cases, during a first phase of coupling the cover sub-assembly to the base sub-assembly, the ferrule is aligned with a socket opening of the optical socket connector by rough mechanical alignment features. The rough mechanical alignment features may comprise a sidewall of the cover sub-assembly may be aligned with a base of the optical socket connector by precise mechanical alignment features. The precise mechanical alignment features may comprise a slanted outer sidewall of the carrier and a slanted inner sidewall of the optical sidewall connector.

In an implementation including a spring within the assembly, prior to coupling the cover sub-assembly to the base sub-assembly, the disc spring may be in an uncompressed state and the carrier may be separated from the cover sub-assembly by a float gap. Additionally, in such an implementation, after coupling the cover sub-assembly to the base sub-assembly, the disc spring may be in a compressed stand and the float gap may be removed.

Furthermore, relative terms used to describe the structural features of the figures illustrated herein are in no way limiting to conceivable implementations. It is, of course, not possible to describe every conceivable combination of components or methods, but one of ordinary skill in the art will recognize that many further combinations and permutations are possible. Accordingly, the invention is intended to embrace all such alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements.

The invention claimed is:

1. An optical assembly, comprising:
a base sub-assembly comprising a mounting point for an optical socket connector; and
a cover sub-assembly to be coupled to the base sub-assembly, and
a carrier to receive an optical fiber ferrule and permit opto-mechanical coupling between the optical fiber ferrule and the optical socket connector when the base-sub assembly is coupled to the cover sub-assembly.

2. The optical assembly of claim 1, wherein the base sub-assembly further comprises:
a paddle card; and
optical processing circuitry disposed on the paddle card, wherein the optical socket connector is disposed on the paddle card.

3. The optical assembly of claim 1, further comprising an optical cable coupled to the ferrule and attached to the cover sub-assembly by a support frame.

4. The optical assembly of claim 1, further comprising a single-bay optical connector coupled to the ferrule and attached to the cover sub-assembly by a second support frame.

5. The optical assembly of claim 1, wherein the multi-bay optical connector comprises multiple ferrules and a multi-bay socket,
wherein the multi-bay socket is attached to the cover sub-assembly without a support frame.

6. The optical assembly of claim 1, wherein the ferrule retention features comprise:
a ferrule carrier to attach a ferrule comprised in the optical fiber, wherein the ferrule carrier and the ferrule are opto-mechanically aligned with the optical socket connector;
guide pins to secure the ferrule carrier on the cover sub-assembly; and
a disc spring between the ferrule carrier and an inner surface of the cover sub-assembly.

7. The optical assembly of claim 6, wherein the cover sub-assembly comprises sidewalls and the base sub-assembly comprises indentations such that the sidewalls fit into the indentations to provide rough mechanical alignment between the ferrule and the socket during an initial stage of coupling the cover sub-assembly and the base sub-assembly.

8. The optical assembly of claim 7, wherein the ferrule carrier and the optical socket configured are dimensioned such that the ferrule carrier bottoms out in the optical socket connector prior to the disc spring being fully compressed.

9. The optical assembly of claim 8, wherein the cover-sub assembly sidewalls and the base sub-assembly indentations are dimensioned such that the cover sub-assembly sidewalls bottom out in the base sub-assembly indentations when the disc spring is fully compressed.

10. The optical assembly of claim 9, wherein the first set of mechanical alignment features comprise inwardly slanting outer side walls and the second set of mechanical features comprise outwardly slanting inner side walls.

11. The optical assembly of claim 6, wherein the carrier comprises a first set of mechanical alignment features and the optical socket connector comprises a second set of mechanical alignment features to interface with first set of mechanical features to align the ferrule into the optical socket connector.

12. A method comprising:
coupling a ferrule of an optical fiber to a carrier;
coupling the carrier to a cover sub-assembly at one of a plurality of mounting locations;
coupling an optical socket connector to a base sub-assembly;
coupling the cover sub-assembly to the base sub-assembly to form a pluggable optical assembly.

13. The method of claim 12, wherein, during a first phase of coupling the cover sub-assembly to the base sub-assembly, the ferrule is aligned with a socket opening of the optical socket connector by rough mechanical alignment features.

14. The method of claim 13, wherein, during a second phase of coupling the cover sub-assembly to the base sub-assembly, the ferrule is aligned with a base of the optical socket connector by precise mechanical alignment features.

15. The method of claim 14, wherein:
the rough mechanical alignment features comprise a sidewall of the cover sub-assembly and an indentation of a sidewall of the base sub-assembly, and
the precise mechanical alignment features comprise a slanted outer sidewall of the carrier and a slanted inner sidewall of the optical sidewall connector.

16. The method of claim 12, wherein coupling the carrier to the cover sub-assembly comprises securing the carrier to the cover sub-assembly using guide pins inserted into indents of an array of indents disposed on an inner surface of the cover sub-assembly.

17. The method of claim 16, wherein coupling the carrier to the cover sub-assembly further comprises disposing a disc spring between the carrier and the inner surface of the cover sub-assembly.

18. The method of claim 17, wherein prior to coupling the cover sub-assembly to the base sub-assembly, the disc spring is in an uncompressed state and the carrier is separated from the cover sub-assembly by a float gap.

19. The method of claim 18, wherein after coupling the cover sub-assembly to the base sub-assembly, the disc spring is in a compressed stand and the float gap is removed.

20. The method of claim 12, wherein coupling the cover sub-assembly to the base sub-assembly comprises coupling a paddle card comprising the optical socket connector to the base sub-assembly.

* * * * *